L. O. GAGNON.
GOGGLES.
APPLICATION FILED JAN. 30, 1917.

1,241,955.  Patented Oct. 2, 1917.

Witness
F. C. Gibson.
P. M. Smith.

Inventor
Leo O. Gagnon.
By Victor J. Evans
Attorney

UNITED STATES PATENT OFFICE.

LEO O. GAGNON, OF SOUTHBRIDGE, MASSACHUSETTS.

GOGGLES.

1,241,955.   Specification of Letters Patent.   Patented Oct. 2, 1917.

Application filed January 30, 1917.   Serial No. 145,510.

*To all whom it may concern:*

Be it known that I, LEO O. GAGNON, a citizen of the United States, residing at Southbridge, in the county of Worcester and State of Massachusetts, have invented new and useful Improvements in Goggles, of which the following is a specification.

This invention relates to goggles or eye glasses or protectors the object of the present invention being to produce goggles especially adapted to be used by persons who are subjected to considerable jarring and jolting, such as mechanics while engaged in their trades, and persons driving motor vehicles, the goggles embodying in connection with the eye pieces, a connecting yoke or frame therefor, and a yieldable bridge or nose piece having a novel mounting in respect to the glasses and the yoke or frame, whereby the goggles are adapted to yield in an upward and downward direction or conversely the nose piece or bridge is adapted to yield in a corresponding direction relatively to the eye pieces and frame, causing the goggles as a whole to rest lightly upon the nose thereby adding greatly to the comfort of the wearer and overcoming the tendency of goggles or eye glasses to slip and become displaced from the person.

With the above and other objects in view, the invention consists in the novel construction, combination and arrangement of parts, herein described, illustrated and claimed.

In the accompanying drawing:—

Figure 1:
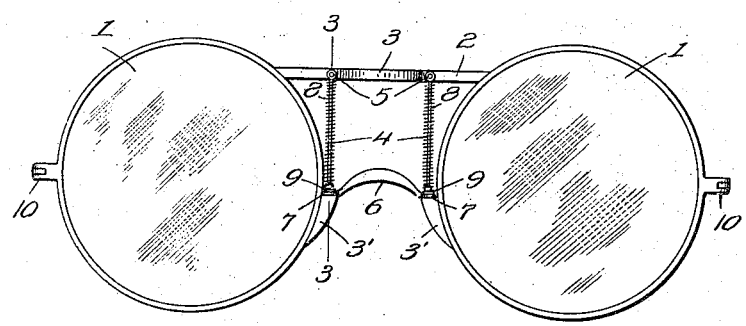
Figure 1 is a front elevation of a pair of goggles embodying the present invention.
Figure 2:
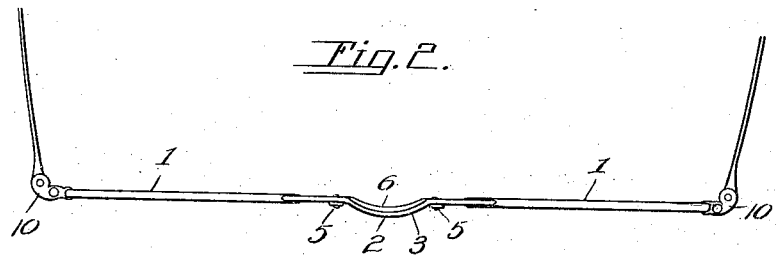
Fig. 2 is a top plan view of the same.
Figure 3:
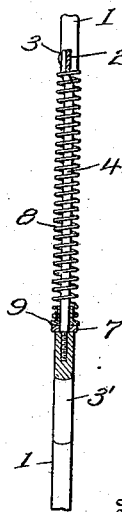
Fig. 3 is an enlarged detail section on the line 3—3 of Fig. 1.

Referring to the drawings 1 designates a pair of eye pieces or glasses which may be of any desired material, shape and size, the same being connected by means of a yoke or connecting bar 2, the central portion of which is off-set in a forward direction as indicated at 3 to prevent said central portion of the bar from bearing against the forehead of the wearer.

To the inner marginal edge of each of the members 1 is fixedly secured a post-holder 3' and fixedly secured to each post-holder and extending upwardly therefrom is a post 4 the upper extremity of which is fastened to the bar 2 at the point 5.

6 designates a bridge or nose piece of the usual arched formation, the same being provided at its opposite extremities with eyes 7 which receive and embrace the posts 4. Light coiled springs 8 encircle the posts 4 and are interposed between the bar 2 and the bridge 6. Eyelets or tubular end pieces 9 are fitted into the opposite extremities of the springs 8 and over the end coils thereof. The goggles are provided with the usual ear engaging members 10 adapted to be passed around the ears of the wearer after the manner of spectacles.

The goggles are worn in the same manner as an ordinary pair of spectacles, the nose piece or bridge 6 resting upon the nose of the wearer. The springs 8 being light and easily yieldable or compressible, the frame 2 and the glasses 1 carried thereby are adapted to yield in an up and down direction without dislodging the bridge 6 or causing the same to alter its position on the nose of the wearer. This prevents the weight of the glasses and their connecting yoke or frame from being borne rigidly by the nose, thereby adding greatly to the comfort of the wearer and eliminating to a considerable extent the liability of the goggles to slip downwardly on the nose due to repeated vibrations.

I claim:—

The combination with a pair of eye pieces, of a connecting yoke or frame to which the same are attached, post-holders on the inner adjacent margins of said eye pieces, posts attached thereto and extending upwardly therefrom and secured at their upper extremities to said yoke, a bridge normally resting upon said post supports and having eyes through which said posts pass, and springs coiled around said posts and interposed between the yoke and nose piece.

In testimony whereof I affix my signature.

LEO O. GAGNON.

Copies of this patent may be obtained for five cents each, by addressing the "Commissioner of Patents, Washington, D. C."